UNITED STATES PATENT OFFICE.

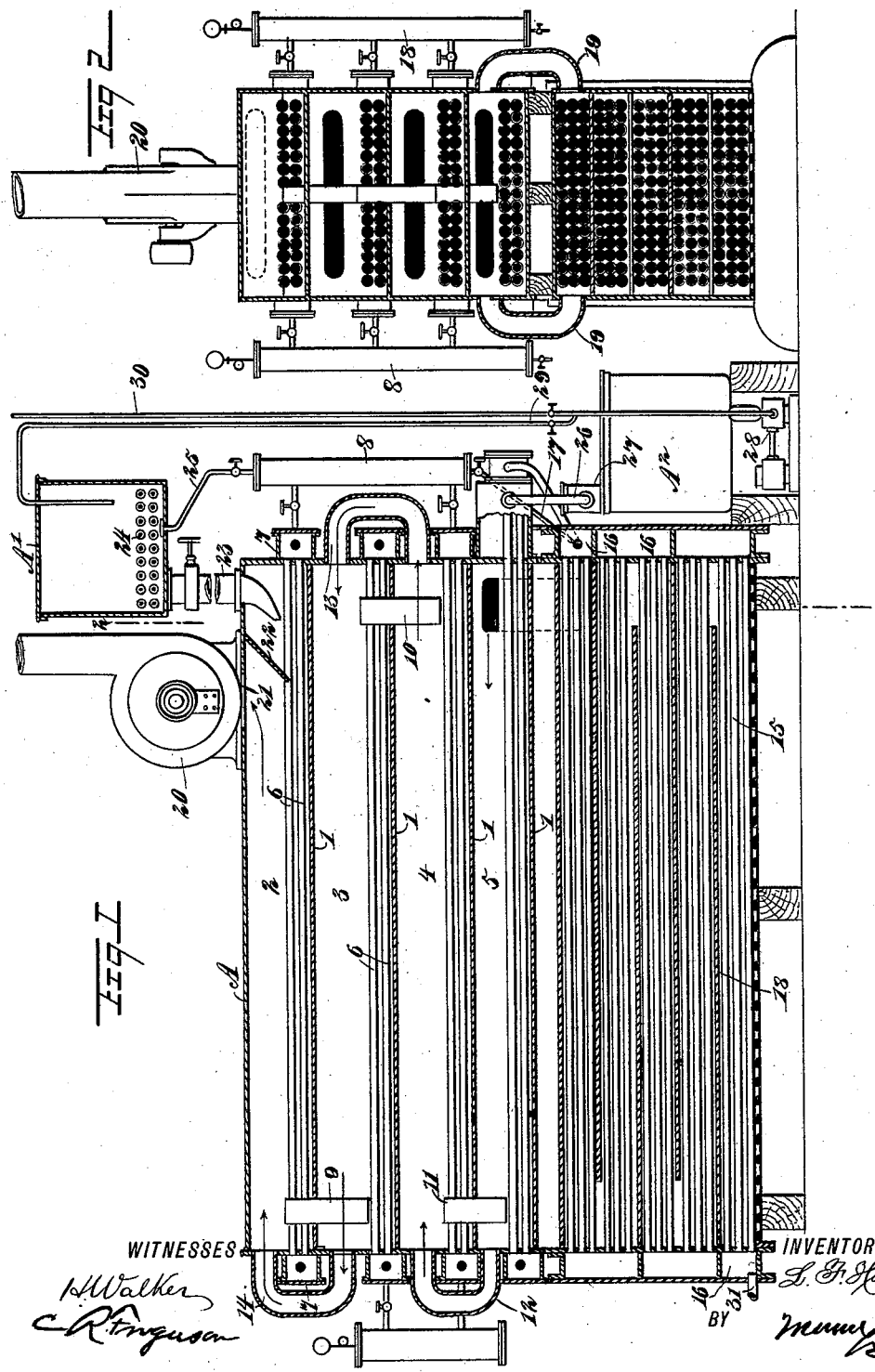

LEON FRANCOIS HAUBTMAN, OF NEW ORLEANS, LOUISIANA.

APPARATUS FOR EVAPORATING LIQUIDS.

SPECIFICATION forming part of Letters Patent No. 568,614, dated September 29, 1896.

Application filed June 8, 1896. Serial No. 594,701. (No model.)

*To all whom it may concern:*

Be it known that I, LEON FRANCOIS HAUBTMAN, of New Orleans, in the parish of Orleans and State of Louisiana, have invented a new and Improved Apparatus for Evaporating Liquids, of which the following is a full, clear, and exact description.

The invention consists in what may be termed a "hydro-absorber." The object is to provide a very simple and comparatively cheap apparatus by means of which a heated current of air may be passed over a flowing sheet or film of liquid in order to evaporate the water from the solution and finally discharge the solution in a concentrated form.

I will describe an apparatus embodying my invention, and then point out the novel features in the appended claims.
Reference is to be had to the accompanying drawings, forming a part of this specification, in which similar characters of reference indicate corresponding parts in both views.

Figure 1 is a vertical section of an apparatus embodying my invention, and Fig. 2 is a section on the line 2 2 of Fig. 1.

Referring to the drawings, A designates a casing, of suitable metal, having horizontal partitions 1 arranged in its upper portion, which provide concentrating-chambers 2, 3, 4, and 5. Arranged in the lower portion of each concentrating-chamber is a series of heating-tubes 6, which communicate at their ends with steam-boxes 7, the several steam-boxes being connected with a manifold 8, which receives steam from any desired source. Communication is provided between the chamber 2 and the chamber 3 by means of a pipe 9, which has its upper portion extended above the bottom of the chamber 2 and its lower portion extended nearly to the pipe 6 in the chamber 3. The object in extending the upper end of the pipe 9 above the bottom of the chamber is to allow only the upper surface or a thin film of the liquid contained in the chamber to overflow through said pipe into the next chamber below. The chambers 3 and 4 are connected by a similar pipe 10, and the chambers 4 and 5 are connected by a similar pipe 11, the pipe 10 being preferably arranged at the end of the casing opposite that of the pipes 9 and 11. An air-pipe 12 leads from the chamber 5 into the chamber 4, an air-pipe 13 leads from the opposite end of the chamber 4 into one end of the chamber 3, and an air-pipe 14 leads from the opposite end of the chamber 3 into the chamber 2.

Below the series of concentrating-chambers and in the casing A is arranged a heater, comprising several series of tubes 15, communicating at their ends with steam-chambers 16, into which steam is admitted by means of the pipe 17 from the manifold 8. These several series of pipes 15 are respectively arranged in compartments formed in the lower part of the casing A by means of longitudinally-extending partitions 18, which, however, do not extend the entire length of the casing, as there is an opening between the partition ends and the end wall of the casing, these openings being arranged alternately at opposite ends, so that air may circulate back and forth over the series of pipes and become thoroughly heated by the steam contained therein.

The portion of the casing A containing the heater-pipes has communication with the lower concentrating-chamber 5 through pipes 19. On the top of the chamber 2 is mounted a suction-fan 20, which may be operated in any desired manner, and the chamber of this suction-fan communicates with the interior of the chamber 2 through an opening 21, and forward of this opening a deflector-plate 22 is extended downward and rearward within said chamber 2.

Arranged above the casing A is a liquor-tank A', communicating with the chamber 2 through a valve-controlled pipe 23. Arranged in the lower portion of this tank A' is a series of steam-circulating pipes 24, which communicate with a valved pipe 25, leading to the manifold 8.

Below the level of the concentrating-chambers is arranged a receiving-tank $A^2$ for concentrated liquor. This tank has communication with the lower concentrating-chamber 5 through a pipe 26, which leads into a test-tube 27, arranged on the upper side of the tank $A^2$, and of course communicates therewith. Arranged adjacent to the tank $A^2$ is a pump 28, designed to force liquor from the tank $A^2$ into a suitable receiver, or back into the liquor-tank A', if it is deemed necessary to treat the liquor a second time. The liquor may be forced into the tank A' through the pipe 29, controlled by a suitable valve, or it may be forced into a receiver through the valve-controlled pipe 30. It will be seen that the bottom wall of the casing A, or that portion underneath the heater, is perforated to allow the entrance of air.

In operation the valve in the pipe 23 will be opened to any desired degree to allow a flow of liquid or liquor from the tank A' into the chamber 2, and at the same time, or while this liquid is flowing from one chamber to another and finally to the tank $A^2$, the steam will be turned on and the fan 20 set in motion. Steam will be passed through the several pipes contained in the several chambers of the heater and the tank A', and while the liquor is flowing in one direction air will be drawn through the apparatus by means of the suction-fan and become heated by means of the heating-pipes, and as this heated air passes over the surface of the flowing liquor it will take up or absorb the moisture contained therein.

It may be here stated that the degree of heat imparted by the steam should be sufficient to maintain the liquor at substantially a boiling-point. The water of condensation may escape through a pipe 31, leading from the lower portion of one of the end chambers of the heater.

Having thus described my invention, I claim as new and desire to secure by Letters Patent—

1. An apparatus for evaporating liquids, comprising a series of communicating concentrating-chambers, steam-pipes arranged in the lower portion of each of said chambers, an air-heater arranged below the series of chambers and having an air-communication with the lower of said chambers, the other of said chambers also having air-communication, a suction-fan for drawing air through the apparatus, a liquor-tank communicating with the upper of said chambers, steam heating-pipes in said tank, and a concentrated-liquor tank having communication with the lower of said chambers, substantially as specified.

2. An apparatus for evaporating liquids, comprising concentrating-chambers arranged one above another, overflow-pipes providing communication between said chambers, the said overflow-pipes being extended upward above the bottom of the chamber into which their upper ends extend, air-pipes providing air-communication between the several chambers, an air-heating chamber arranged below the series of concentrating-chambers, heating-pipes arranged therein, a pipe-communication between said heating-chamber and the lower of the concentrating-chambers, means for forcing air through the apparatus, the said air being forced in a direction opposite to that in which the liquor is flowing through the apparatus, a liquid supply, and a liquid-receiver, substantially as specified.

3. An apparatus for evaporating liquids, comprising a series of concentrating-chambers arranged one above the other and communicating one with another, both for the passage of liquor and for the passage of heated air, steam-conveying pipes located in the lower portion of each of said chambers, steam-boxes into which said pipes lead, a manifold having connection with said steam-boxes, an air-heater located beneath the series of concentrating-chambers and having connection with said manifold, a liquor-tank arranged above the series of chambers and having a valved communication with the upper of said chambers, steam-pipes in said tank receiving steam from said manifold, a tank for concentrated liquor having communication with the lower of the concentrating-chambers, and a pump operating to force concentrated liquor from said tank, substantially as specified.

LEON FRANCOIS HAUBTMAN.

Witnesses:
GEO. DUDLEY,
JNO. D. TOWNSEND.